March 28, 1939.  P. H. RAVEN  2,151,870
TRAILER
Filed April 19, 1938  2 Sheets-Sheet 1

Inventor
P. H. Raven

By Clarence A. O'Brien
and Hyman Berman
Attorneys

March 28, 1939.　　　　P. H. RAVEN　　　　2,151,870
TRAILER
Filed April 19, 1938　　　2 Sheets-Sheet 2
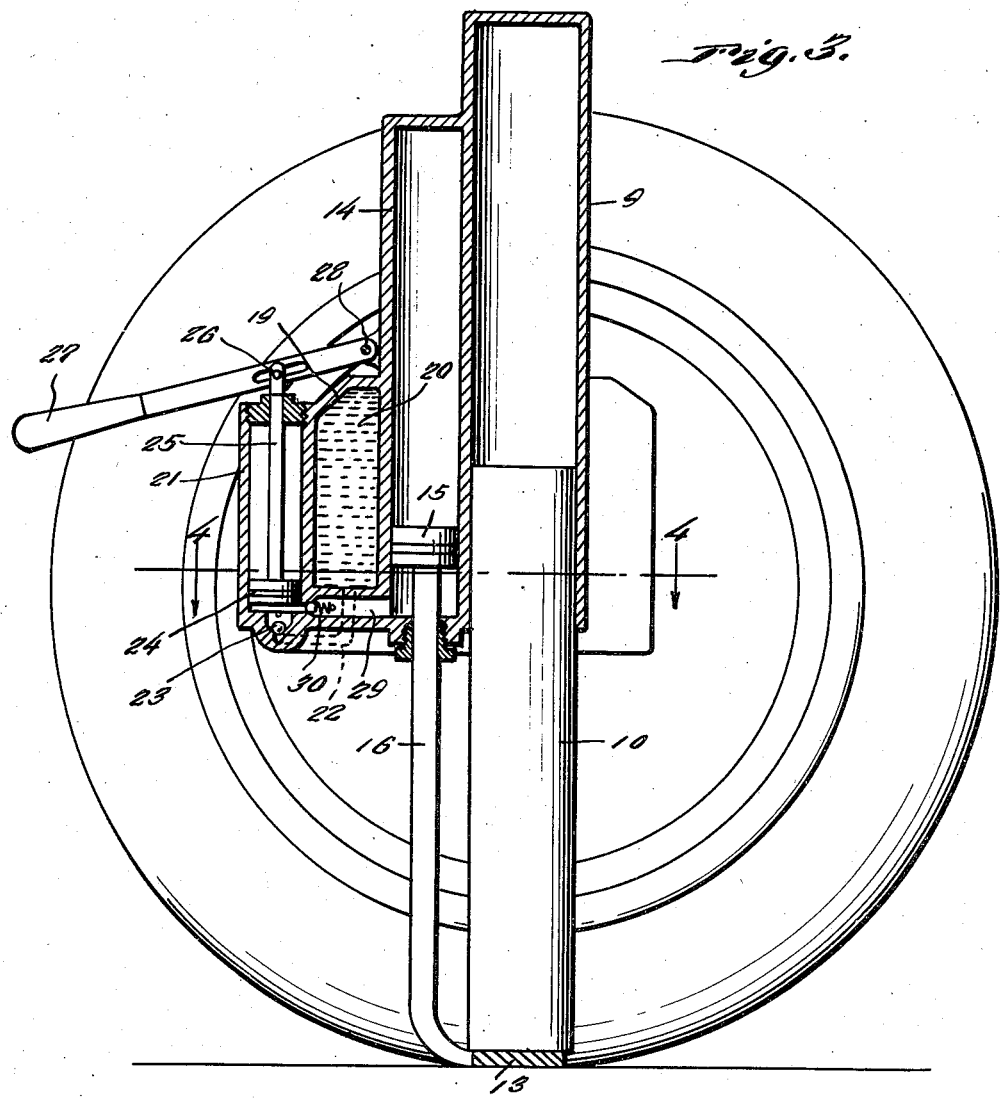
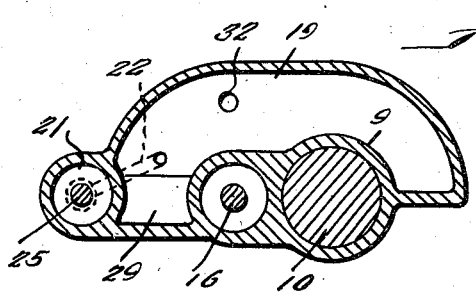
Inventor
P. H. Raven
By Clarence A. O'Brien
and Hyman Berman
Attorneys Patented Mar. 28, 1939

2,151,870

UNITED STATES PATENT OFFICE 2,151,870

TRAILER

Philip H. Raven, Goshen, Calif.

Application April 19, 1938, Serial No. 202,969

1 Claim. (Cl. 254—2)

This invention relates to trailers or work carriers of the type in which a load of work, such as pipes, lumber or the like may be raised, carried and deposited in any desired place.

In accordance with the present invention a trailer is provided which comprises a bed member supported between a pair of wheels and mechanism connecting the axles of the wheels and the bed member in such a manner that the bed member may be raised and lowered in a positive and efficient manner.

The invention together with its objects and advantages will be best understood from a study of the following description taken in connection with the accompanying drawings wherein:

Figure 3 is a transverse sectional view through the trailer illustrating certain details hereinafter more fully referred to and Figure 4 is a horizontal fragmentary detail sectional view taken substantially on the line 4—4 of Fig. 3.

Figure 1:
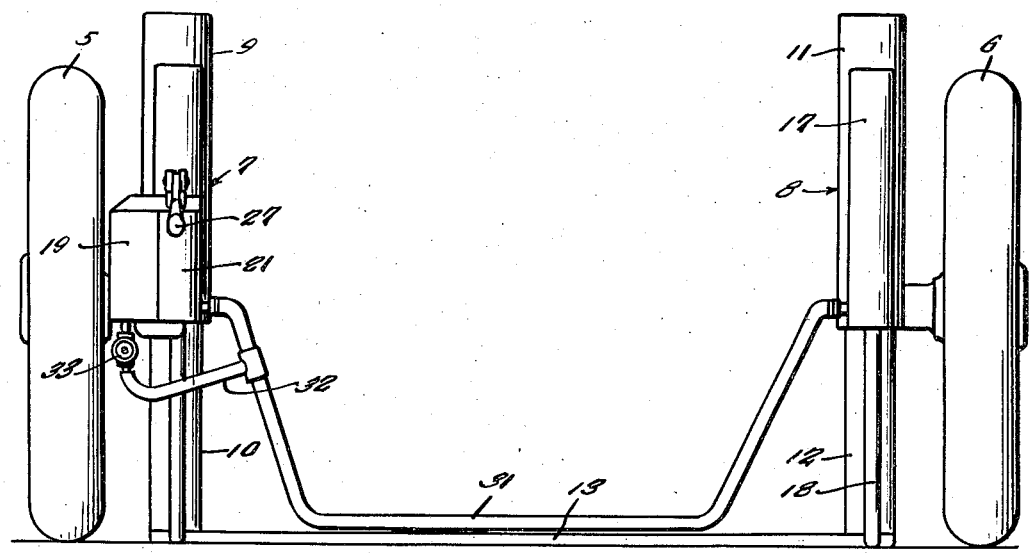
Figure 1 is an elevational view of the trailer.
Figure 2:
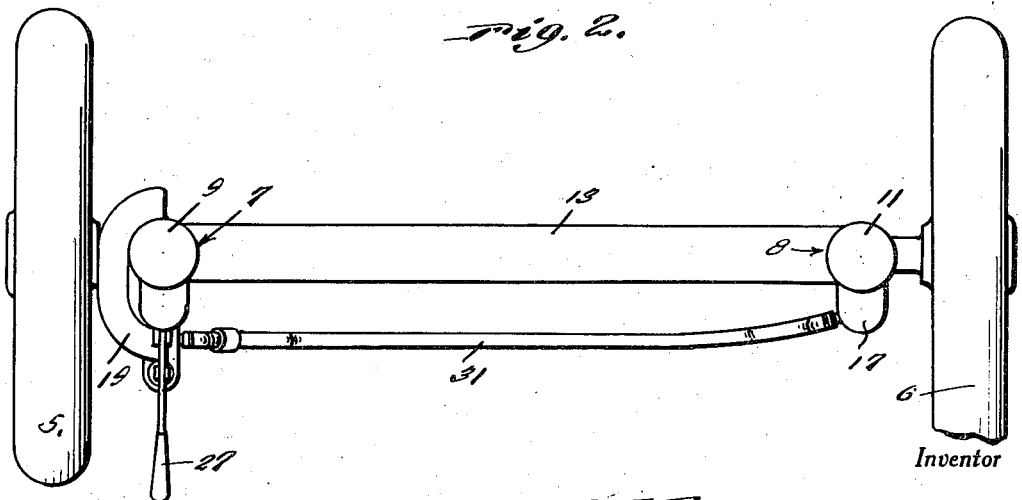
Figure 2 is a top plan view thereof.

Referring to the drawings by reference numerals it will be seen that the trailer, in a preferred embodiment thereof, is illustrated as a two wheel trailer and comprises a pair of ground wheels 5 and 6.

Each of the wheels 5 and 6 is mounted on a suitable stub axle.

Mounted on the axle of the wheel 5 is a casting 7 while mounted on the axle of the wheel 6 is a casting 8.

Casting 7 embodies a vertical cylinder 9 in which operates a plunger 10 while casting 8 embodies a vertical cylinder 11 in which operates the plunger 12.

Secured to the lower ends of the plungers 10 and 12 to be raised and lowered by the vertical movement of the plungers is the bed 13 of the trailer, the same being in the form of a narrow elongated bar.

The casting 7 also embodies an integral fluid cylinder 14 in which operates the piston 15 provided with a rod 16 that at its lower end is integral with or otherwise positively connected with the bed bar 13 as suggested in Fig. 3 so that vertical movement of the piston 15 is transmitted to the bar 13.

Also casting 8, similar to casting 7 is provided with a cylinder 17 in which operates a piston provided with a rod 18 that at its lower end is also connected with, in any suitable manner, preferably by being integral therewith, the bed bar 13 to cooperate with the piston 15 and its rod 16 for raising and lowering the bed bar.

Casting 17 also has integral therewith a fluid chamber 19 for the storage of oil or the like 20. Also integral with the casting 7 is a pump cylinder 21 the bottom of which is connected with the chamber 19 through the medium of a conduit passage 22 which at the end thereof opening into the pump cylinder 21 is controlled by a suitable ball check valve 23 as shown in Fig. 3.

Operating in the pump cylinder 21 is a pump piston 24 that has a piston rod 25 provided at its upper end with a lost motion or pin and slot connection 26 with an operating lever 27 that is pivoted at one end to the casting as at 28.

Cylinder 14 of casting 7 is connected with the pump cylinder 21 of casting 7 through the medium of a conduit 29, and the flow of oil from the pump cylinder 21 through the passage 29 is controlled by a spring pressed ball check valve 30.

Also cylinder 14 of casting 7 is connected with cylinder 17 of casting 8 through the medium of a substantially U-shaped conduit 31, and this conduit 31 is also connected with the reservoir 20 through the medium of a conduit 32 that has arranged therein check valve 33.

It will be obvious that to load work on the trailer the bed 13 thereof is in a lowered position shown in the drawings. When the work has been lowered thereon handle 27 is operated to reciprocate piston 24 whereby to draw oil from the reservoir 19 and force the oil from said reservoir through the passage 29 into the cylinder 14 and from the cylinder 14 through the conduit 31 into the cylinder 17 whereby to raise the pistons 15 in the cylinders 14 and 17 and thereby elevate the bed 13 and the work thereon.

To unload the work from the trailer valve 33 is opened so that the weight of the work on the bed 13 will cause the bed to move downwardly, and obviously as piston 15 moves downwardly the fluid will be forced from the cylinders 14 and 17 through the conduits 31 and 32 back into the reservoir 19.

While I have illustrated the invention as applied to a two wheel trailer it will be understood that the invention may also be applied to a four wheel trailer.

It is thought that a clear understanding of the construction, utility, and advantages of a trailer of this character will be had without a more detailed description.

What is claimed is:—

A device of the class described comprising a pair of supporting structures, an outwardly extending spindle carried by each structure, a wheel on each spindle, a vertically arranged guiding member carried by each structure, a vertically arranged plunger movable in each guiding member, a cross bar connecting the lower ends of the plungers together, a vertically arranged cylinder carried by each structure, a piston in each cylinder, a rod depending from each piston and having its lower end connected with the lower end of the adjacent plunger, a reservoir carried by one structure, a pump cylinder carried by the last-mentioned structure, a conduit connecting the reservoir with the lower end of the pump cylinder, a check valve controlling the conduit, a second conduit connecting the lower end of the pump cylinder with the lower end of the adjacent first mentioned cylinder, a check valve in said second conduit, a third conduit connecting the second conduit with the lower end of the cylinder of the other structure, a return conduit connecting the third conduit adjacent that end which is connected with the pump carrying structure to the reservoir, a manually actuated valve in the return conduit, a piston in the pump cylinder and means for reciprocating the same.

PHILIP H. RAVEN.